(12) United States Patent
White et al.

(10) Patent No.: US 6,468,143 B1
(45) Date of Patent: Oct. 22, 2002

(54) AUTOMATED PEPPERONI CASING END-CUTTING AND STRIPPING STATION

(75) Inventors: James E. White, Everton, MO (US); Gregory A. Roepka, Hutchinson, KS (US)

(73) Assignee: Stainless Steel Systems, Inc., South Hutchinson, KS (US)

( * ) Notice: Subject to any disclaimer, the term of this patent is extended or adjusted under 35 U.S.C. 154(b) by 0 days.

(21) Appl. No.: 09/888,014

(22) Filed: Jun. 22, 2001

(51) Int. Cl.[7] .............................................. A22C 13/02
(52) U.S. Cl. .............................. 452/32; 452/50; 452/31
(58) Field of Search ............................... 452/31, 32, 50

(56) References Cited

U.S. PATENT DOCUMENTS

| | | | | |
|---|---|---|---|---|
| 2,369,360 A | * | 2/1945 | Martin | 452/50 |
| 3,533,495 A | * | 10/1970 | Wallace | 198/468.6 |
| 4,060,875 A | * | 12/1977 | Gosling et al. | 452/31 |
| 4,414,707 A | | 11/1983 | Kokem | |
| 4,622,718 A | | 11/1986 | Glanz et al. | |
| 4,682,387 A | * | 7/1987 | Leining | 452/50 |
| 5,246,395 A | | 9/1993 | Zirps et al. | |
| 5,649,858 A | | 7/1997 | Williams et al. | |
| 5,928,073 A | * | 7/1999 | Andersson et al. | 452/50 |
| 6,062,973 A | * | 5/2000 | Baertlein | 30/228 |
| 6,080,055 A | * | 6/2000 | Leining et al. | 452/50 |
| 6,132,779 A | | 10/2000 | Lancoste-Bourguacq | |

* cited by examiner

Primary Examiner—Charles T. Jordan
Assistant Examiner—Susan C. Alimenti
(74) Attorney, Agent, or Firm—Shughart Thomson & Kilroy P.C.

(57) ABSTRACT

An end-cutting and stripping station for removing casings from sausages is disclosed. The station comprises a carousel having end-cutting units spaced around its perimeter. The carousel is connected to a conveyor, each unit receiving a sausage as the conveyor advances. Each unit includes a sausage support and a carriage slidably mounted below the support. An actuator is connected between the carriage and the carousel. As the actuator retracts, sensor fingers on the carriage slidingly engage a sausage on the support. When the finger tips reach the bottom end of the sausage, the fingers move inwardly, actuating a control valve and halting the carriage. A casing cutter is then actuated to cut off the lower end of the casing above the finger tips. As the conveyor exits the carousel, a pair of stripper bars positioned below the conveyor engage the tops of the sausages and force them out of the casings.

23 Claims, 7 Drawing Sheets

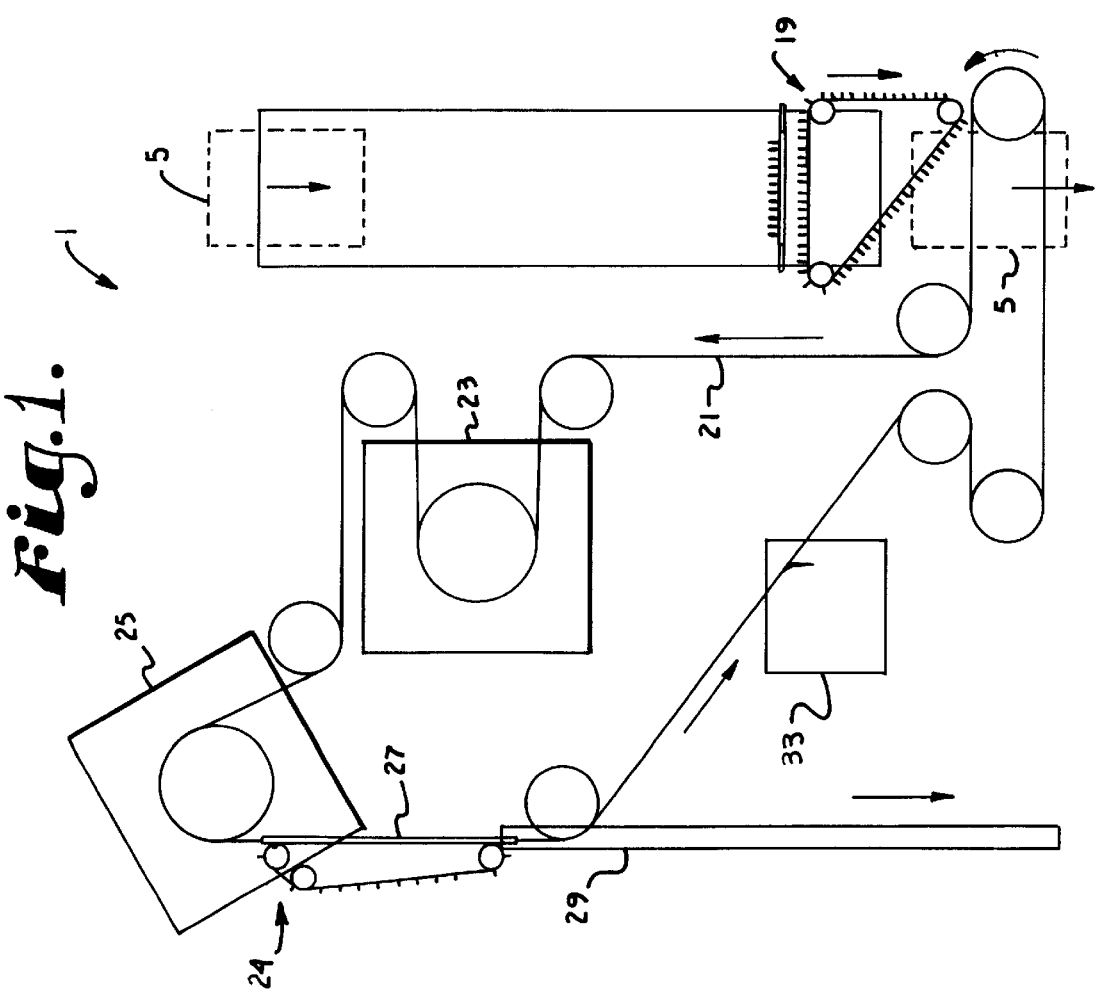

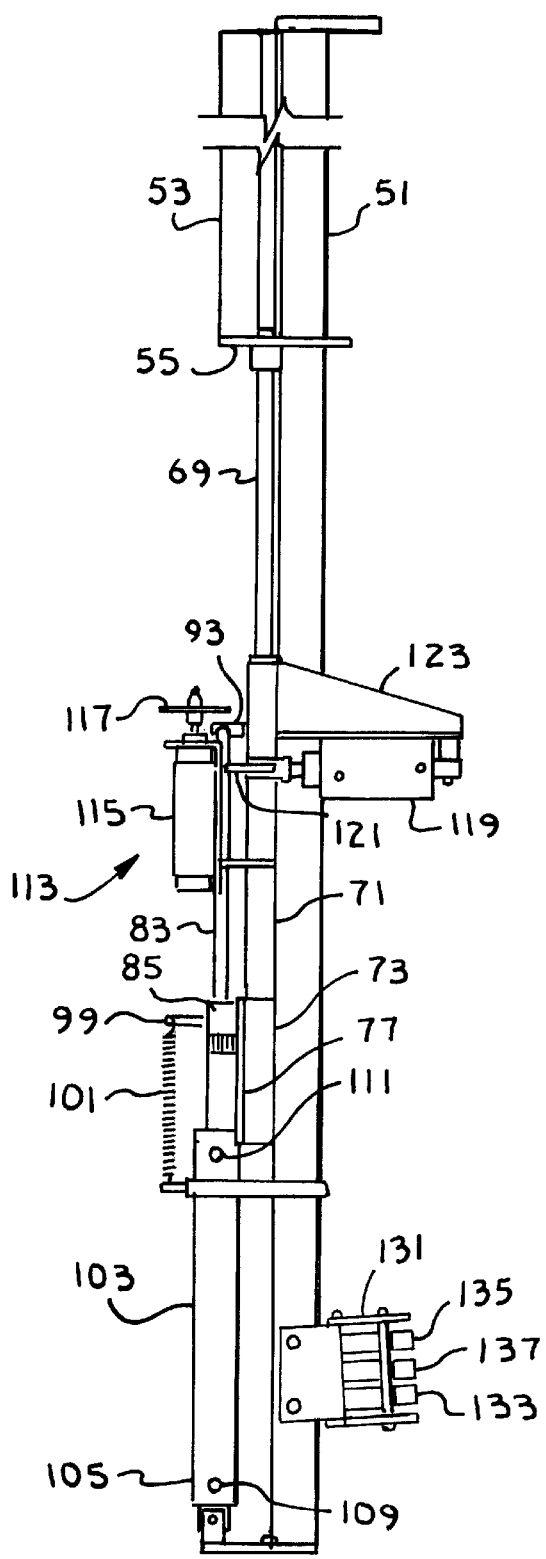
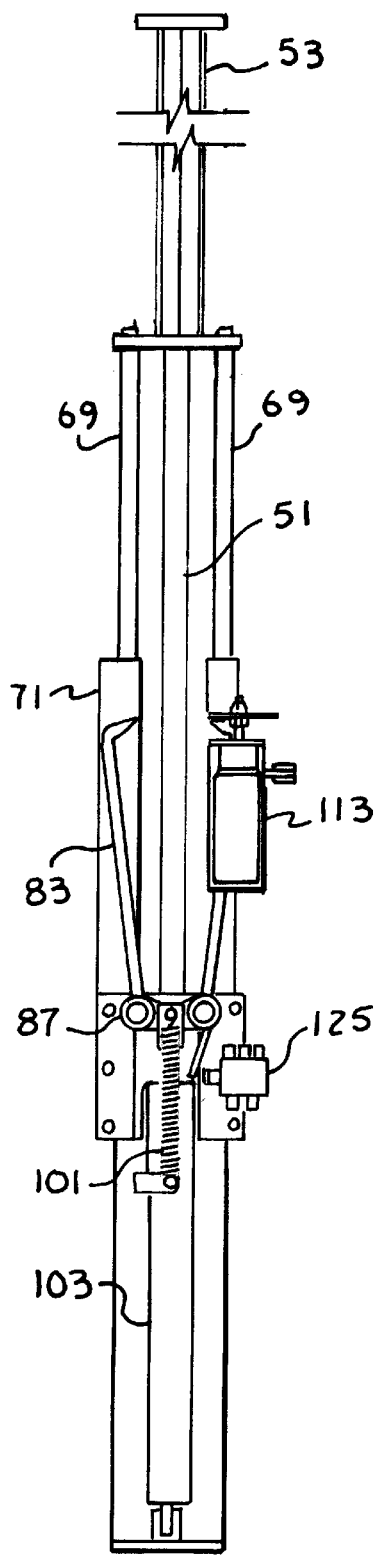

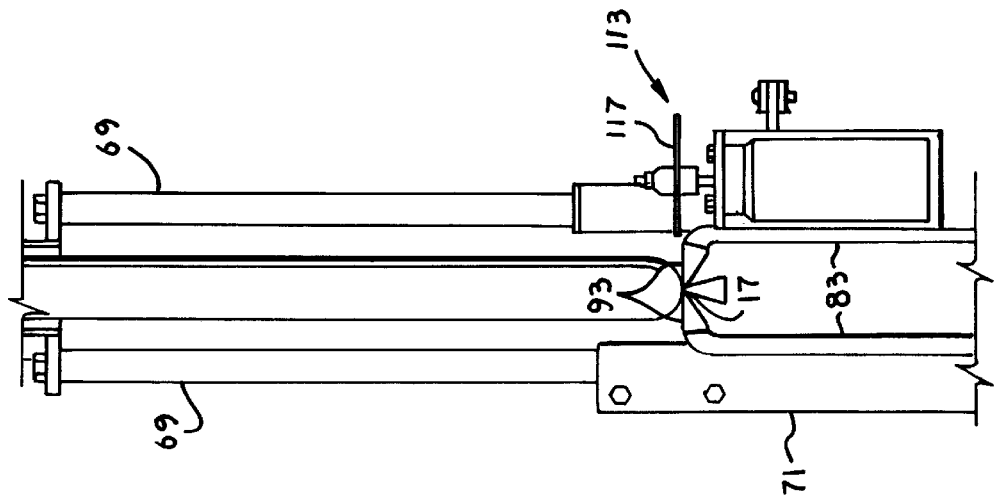
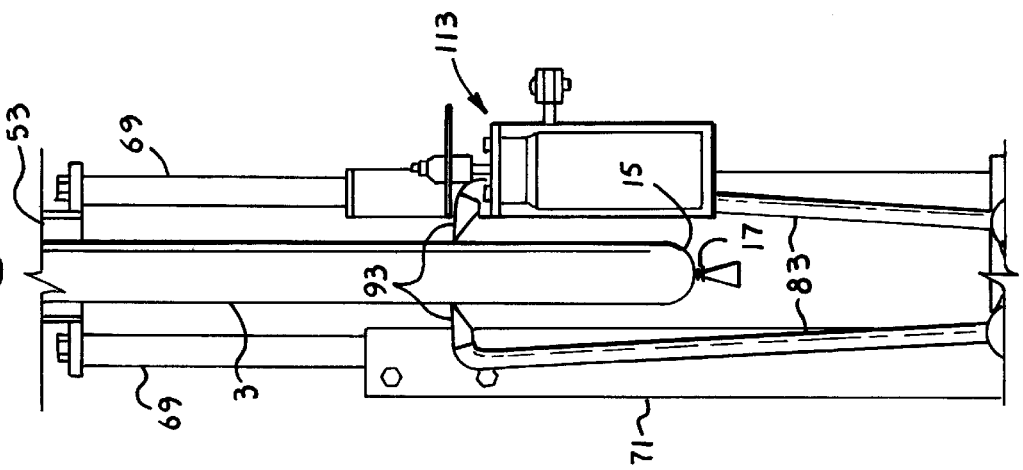
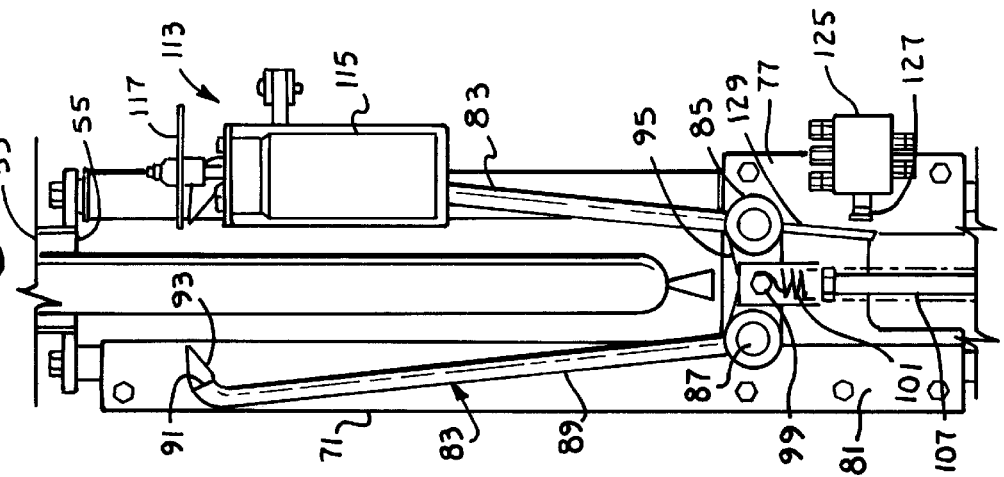

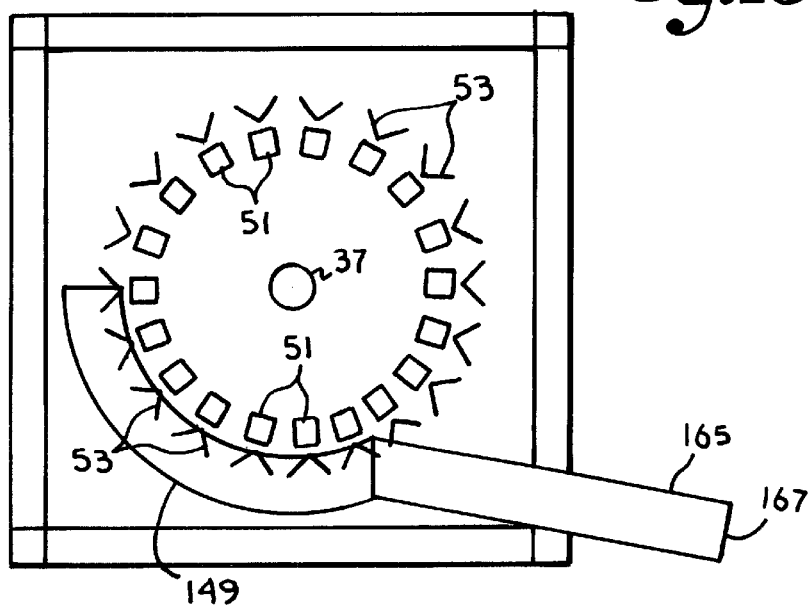
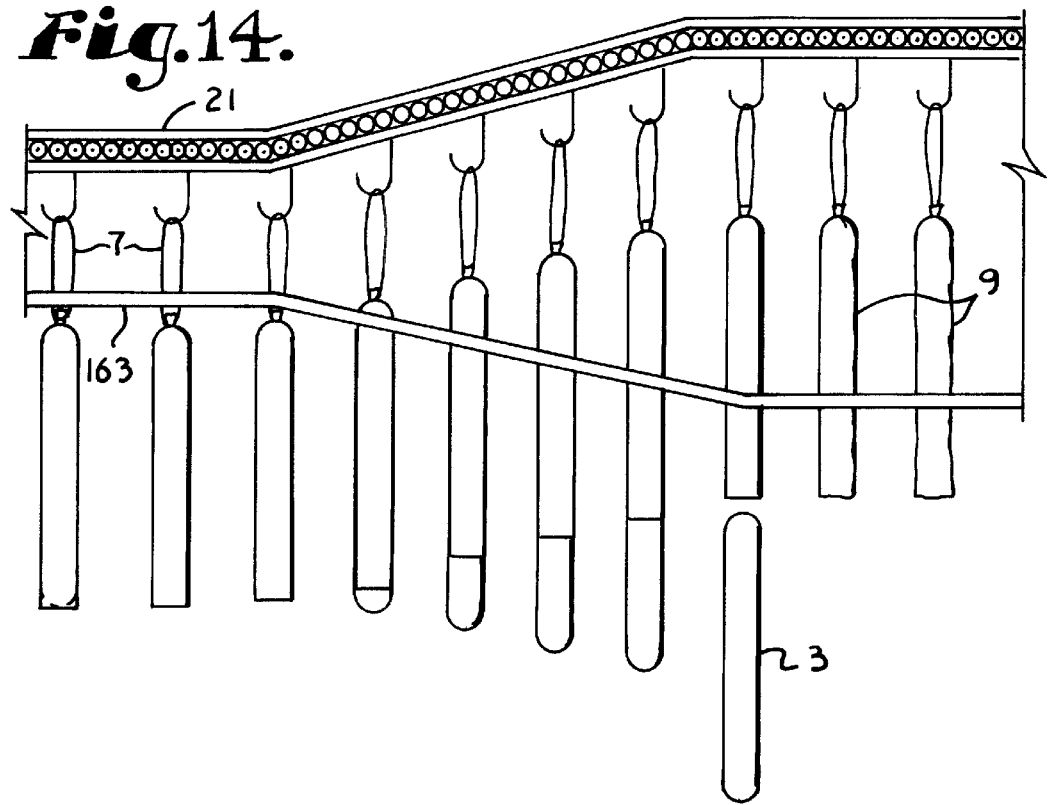

AUTOMATED PEPPERONI CASING END-CUTTING AND STRIPPING STATION

BACKGROUND OF THE INVENTION

1. Field of the Invention

This invention relates to a station for a processing line which automatically cuts an end off of the casings on a succession of sausages, such as pepperoni, and strips the casings from the sausages, the casings having been loosened on the sausages at a previous station on the processing line.

2. Description of the Related Art

Pepperoni and other dry sausages are produced by stuffing meat, seasonings, curing salts, and a starter mixture of selected bacteria into a casing which was traditionally made of animal intestine. Today, the casings are more typically made of a synthetic material. The casing is closed at each end either by tying or by a metal clip. After the sausages have been stuffed, they are placed on racks in a fermentation room where the bacteria produce lactic acid. It is the presence of this lactic acid, in addition to the seasonings, which gives the sausage its familiar tangy flavor. After fermentation, the racks of sausages are moved to a drying room where they remain for several weeks until the proper water content is reached.

Pepperoni is most often used in sliced form on pizza, in sandwiches and salads, and in other foods. Commercial pepperoni producers slice and package the pepperoni in bulk for use in preparing these food items. Before the pepperoni can be sliced, however, the sausage must first be removed from the casing, which is inedible. Modem synthetic casings are reusable and therefore it is advantageous to remove the casings from the pepperoni in such a manner that the casings are not damaged.

Pepperoni casings have traditionally been removed by labor intensive hand removal methods. In one such method, the sausages are brought into a processing area on their drying racks, usually by means of a fork lift. Each sausage is then manually removed from the rack. A worker then takes a sausage and inserts a probe connected to an air hose into one end of the casing. The worker partially inflates the casing, causing the casing to begin to separate from the pepperoni. By "massaging" the sausage between his hands, the worker moves the air around inside the casing, forcing the air between the casing and the pepperoni, and thereby completes the separation process. The worker then cuts off the tie or clip. The casing can then be pulled off of the pepperoni.

In today's market, increased demand for sliced pepperoni for use on pizzas and escalating labor costs have made inefficient manual casing removal techniques undesirable. Unfortunately, however, the automated casing removal machines which have been known previously have not been able to perform the casing removal task as well as can be done by hand.

U.S. Pat. No. 6,080,055 issued to Lyndon R. Leining et al. and entitled "Method and Apparatus for Stripping Cases From Sausages" discloses such an automated machine. In this device, pepperoni sausages are placed on an indexing conveyor which moves the sausages two at a time through a series of stations. At the first station, air is injected into the sides of the casings proximate each end thereof At the second station, the casings are scored along a transverse line near each end, defining an end cap, and each end cap is pulled off At the third station, a longitudinal cut is made down the length of each casing. At the fourth station, gripping fingers grab the casing and pull it off the sausage. While this machine is capable of automatically removing the casings from pepperoni, the casings are destroyed in the process and cannot be reused.

U.S. Pat. No. 4,463,641 issued to Eiichi Sato discloses a device for cutting knotted ends off of "tube bags" containing meat products. This is done in order to make the product easier to package. The device includes an annular stopper which engages the end of the bagged product and a pair of pliers which grasp the bag proximate the sealing clip. The pliers are then puffed away from the stopper to stretch the portion of the bag located therebetween. The bag is then cut between the pliers and the stopper by a cutter blade. The inventor likens the process used by the device to cutting the head off a turtle, stating that "the retracted turtle's neck must be drawn out before being cut off."

SUMMARY OF THE INVENTION

The present invention is a casing end-cutting and stripping station for removing the casings from a succession of sausages. The end-cutting and stripping station is part of a sausage processing line which includes a casing disengaging station which loosens the casings on the sausages prior to their reaching the end-cutting and stripping station. The sausages are suspended from a main conveyor by respective string loops such that they hang generally vertically downward. The main conveyor carries the sausages through the disengaging station to the end-cutting and stripping station.

The end-cutting and stripping station comprises a carousel mounted for rotation about a generally vertical axis, the carousel including a plurality of casing end-cutting units circumferentially spaced around the perimeter thereof The carousel is operatively connected to the main conveyor such that each end-cutting unit receives a respective sausage as the main conveyor advances.

Each end-cutting unit includes a frame member removably attached to the carousel and sausage support for supporting a sausage connected to the frame member. A carriage is slidably mounted to the frame member below the sausage support. A pair of sensor fingers are pivotally mounted to the carriage such that they extend upwardly from the carriage toward the sausage support. The tips of the sensor fingers are angled inwardly toward one another. A lever arm is connected to each sensor finger proximate its pivot point. Each lever arm is generally transverse to its respective sensor finger and extends outwardly toward the other sensor finger. Each lever arm includes a pin receiver, the pin receivers being alignable with one another. A pin is mutually received by both pin receivers. A spring is connected to the pin and biases the pin downwardly such that the sensor finger tips are pulled toward one another.

A first linear actuator or lift cylinder, which may be pneumatically operated, is connected between the pin and the frame member. With the lift cylinder connected in this fashion, extension of the lift cylinder both moves the carriage upwardly toward the sausage support and pivots the tips of the sensor fingers away from each other in opposition to the spring bias. Retraction of the lift cylinder moves the carriage downwardly and allows the spring bias to pivot the sensor fingers tips toward one another. An air control valve mounted on the carriage proximate one of the sensor fingers is operatively connected to the lift cylinder such that closure of the air control valve will stop retraction of the cylinder. The air control valve includes a trigger which is engaged by a lever on the adjacent sensor finger upon inward movement of the sensor finger to close the valve.

A casing end-cutter comprising an air motor with a circular blade is pivotally connected to the carriage. A second linear actuator or pivot cylinder is connected between the end-cutter and the carriage for moving the end-cutter between a retracted position and a cutting position. In the cutting position, the blade is positioned immediately above the tips of the sensor fingers.

As the lift cylinder retracts and the carriage moves away from the lower end of the sausage support, the sensor finger tips slidingly engage a sausage supported on the sausage support. When the tips reach the bottom end of the sausage, the spring causes the sensor fingers to move inwardly, following the converging sides of the sausage. The inward movement of the fingers actuates the air control valve trigger, stopping the carriage. The casing cutter is then moved into the cutting position to cut off the lower end of the casing above the sensor finger tips. As the carousel continues to rotate, a plate supports the lower end of the sausage so that it cannot fall out of the casing prematurely.

As the main conveyor moves the sausages off of the carousel, the sausages are supported in a generally upright position by a second conveyor positioned below the main conveyor. The second conveyor comprises a belt with vertical slats forming sausage supporting slots therebetween. A plate continues to support the bottom ends of the sausages.

A pair of stripper bars are positioned below the main conveyor and above the second conveyor for engaging the top ends of the sausages. The string loops which connect the sausages to the main conveyor pass between the stripper bars, however the bars are spaced sufficiently close to one another that the sausages cannot pass between them. The portion of the main conveyor above the stripper bars is angled upwardly such that the tops of the sausages are pulled against the stripper bars. The tension thus created in the string loops acts to pull the casings off of the sausages. The empty casings continue along the main conveyor to a holding bin. The sausages are temporarily supported by second conveyor until they reach the end of the bottom plate, at which point the sausages drop onto a high speed conveyor which transports them to a slicing station.

BRIEF DESCRIPTION OF THE DRAWINGS

FIG. 1 is a schematic diagram of a sausage processing line.

FIG. 2 is a perspective view of a pepperoni sausage suspended on a hook.

FIG. 6 is a side view of one end-cutting unit of the casing end-cutting apparatus.

FIG. 7 is a front view of one end-cutting of the casing end-cutting apparatus.

FIG. 10 is a partial front view of one of the end-cutting units showing the carriage in its initial position with the sensor fingers spread apart to receive a sausage.

FIG. 11 is a partial front view of one of the end-cutting units showing the carriage moving downwardly with the sensor fingers slidingly engaging the sausage casing.

FIG. 12 is a partial front view of one of the end-cutting units showing the carriage in a cut-off position with the sensor fingers pivoted inwardly proximate the lower clip of the sausage.

FIG. 13 is a cross-sectional view of the casing end-cutting apparatus taken generally along line 13—13 in FIG. 5.

FIG. 14 is a partially schematic view of the main conveyor and stripper rods showing sausage casings being stripped from the sausages.

DETAILED DESCRIPTION OF THE PREFERRED EMBODIMENT

Figure 3:
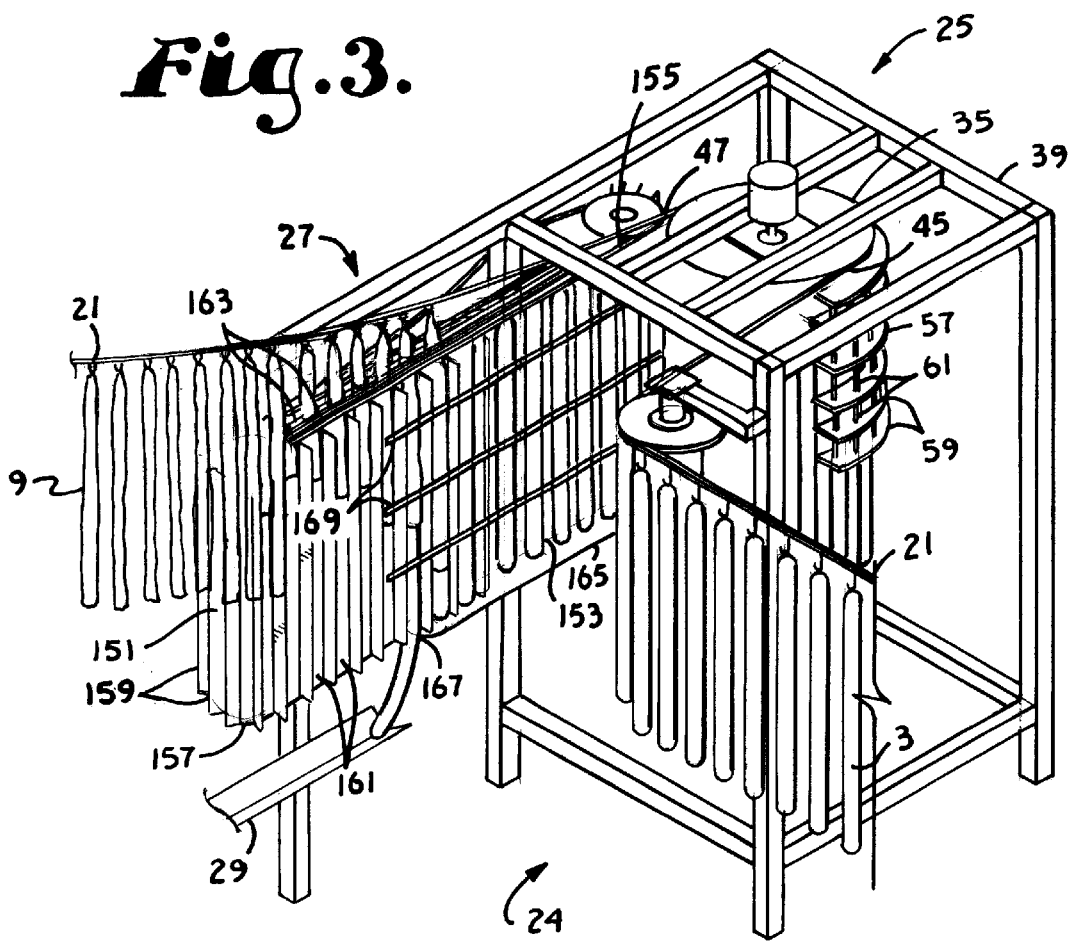
FIG. 3 is a perspective view of the casing end-cutting and stripping station.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain objects and advantages of this invention will become apparent from the following description taken in conjunction with the accompanying drawings wherein are set forth, by way of illustration and example, certain embodiments of the invention.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings in more detail, and in particular to FIG. 1, the reference number 1 generally designates a pepperoni processing line having a plurality of processing stations. Pepperoni sausages 3 are brought onto the processing line 1 on racks or trees 5 where they are suspended by respective loops of string 7 on hooks 8. Each tree has a plurality of rows of hooks 8, typically fifteen rows with twelve hooks per row. As seen in FIG. 2, the sausages 3 are encased in casings 9 closed at their top ends 13 and bottom ends 15 by clips 17. The string loops 7 are held in place by the upper clips 17. The rows of sausages 3 are automatically and sequentially removed from the trees 5 at a transfer station 19 and placed in line on a main conveyor 21 such that a succession of sausages 3 are moveably suspended from the main conveyor 21 by their respective strings 7. The main conveyor 21 carries the sausages 3 to a casing disengaging station 23 where the casings 9 are loosened from the sausages 3 in preparation for their removal. As an alternative to the use of the automatic transfer station 19, it is foreseen that the sausages 3 could be manually placed on the main conveyor 21.

From the disengaging station 23, the main conveyor 21 carries the sausages 3 to an end-cutting and stripping station 24 which includes a casing end-cutting apparatus 25 which cuts the casings 9 just above the lower clip 17, opening the bottom end 15 of the casing 9. The cutting and stripping station 24 further includes a casing stripper 27 which removes the sausages 3 from the casings 9 through the respective open bottom ends 15. The sausages 3 drop out of the casings 9 and onto a high speed conveyor 29 which transports them to a slicing station (not shown) where they are sliced for subsequent packaging and use. The casings 9 continue along the main conveyor 21 to a holding bin 33 where they are collected. The casing removal process herein described leaves the casings 9 essentially intact, except for a portion of the lower end which is removed, so that they can be cleaned and reused in the production of more sausages 3.

Figure 5:
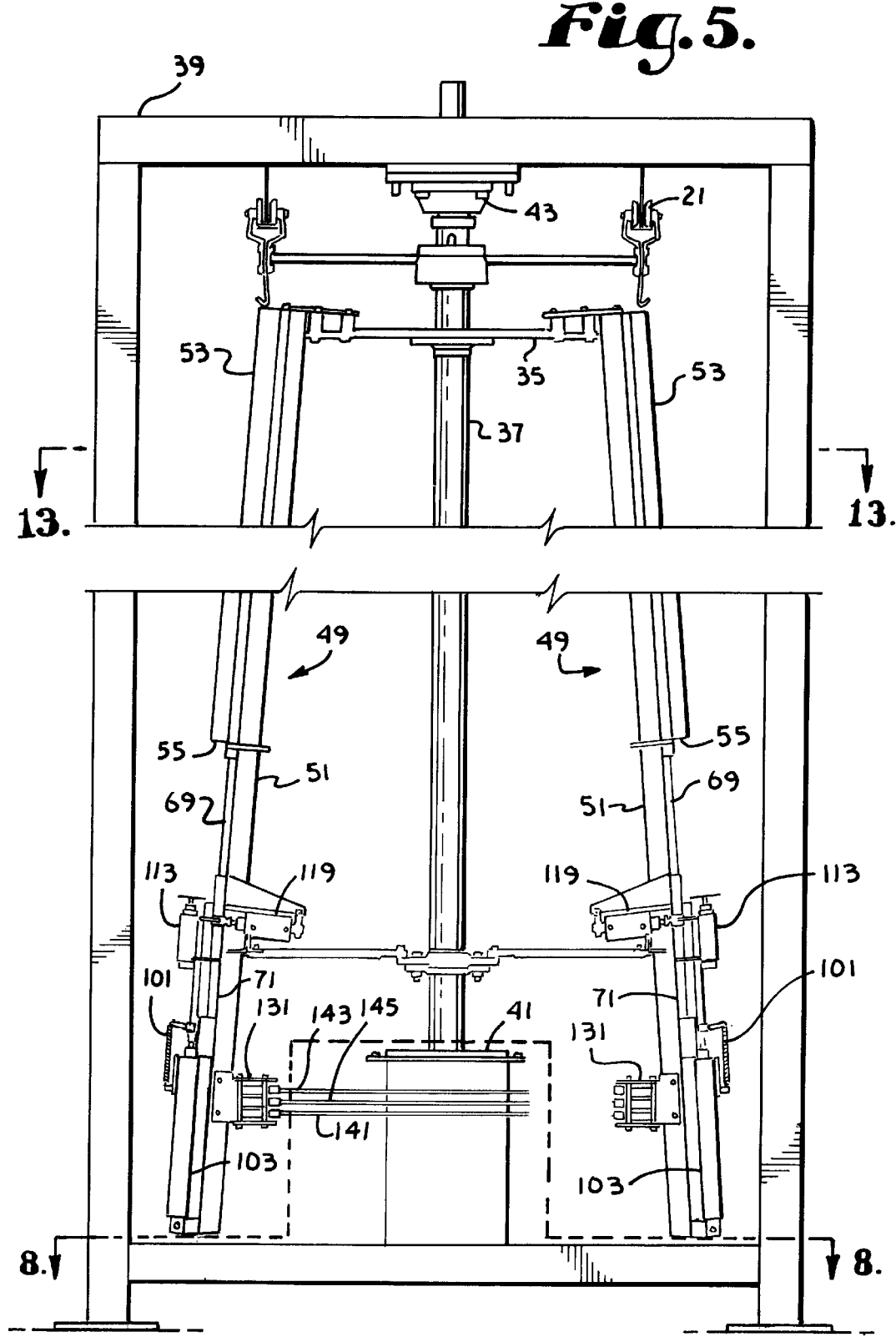
FIG. 5 is a side view of the end-cutting apparatus having all but two of the sausage casing end-cutting units removed therefrom for clarity.

The present invention comprises a casing end-cutting and stripping station 24 for use as a part of the processing line 1. Referring to FIG. 3, the station 24 includes a casing end-cutting apparatus 25 and a casing stripper 27. As best seen in FIG. 5, the end-cutting apparatus 25 comprises a carousel 35 which is rotatably mounted on a vertical shaft or axle 37 within a carousel supporting framework or superstructure 39. The axle 37 is rotatably supported by a lower hub 41 and an upper bearing 43 connected to the superstructure 39. Referring again to FIG. 3, the carousel 35 is operatively connected to the main conveyor 21 which is entwined around the carousel 35 in such a manner that the carousel 35 rotates in synchronization with the main conveyor 21. The main conveyor 21 enters the carousel 35 at an entrance point 45 and exits the carousel 35 at an exit point 47 located approximately 180 degrees around the carousel 35 from the entrance point 45. The direction of rotation of the carousel 35 is shown in FIG. 1 as being counterclockwise when looking at the carousel 35 from above; however, the direction is not critical.

Referring again to FIG. 5, the carousel 35 includes a plurality of casing end-cutting units 49 which are spaced circumferentially around the perimeter of the carousel 35. The upper ends of the units 49 are positioned radially inward relative to the lower ends to form a substantially frustoconical array of units 49 about the carousel 35. The carousel 35 shown in FIG. 5 would have nineteen of the end-cutting units 49, however all but two have been removed for clarity. Each of the casing end-cutting units 49 is adapted to accept a single sausage 3 suspended from the main conveyor 21 and cut the respective casing 9 immediately above the clip 17 on the bottom end 15 thereof. Because the casing end-cutting units 49 are identical to each other, only a single unit 49 will be described in detail herein.

The end-cutting unit 49 is built around a frame member 51 which is connected to the carousel 35 only at the top and bottom thereof so that the unit 49 functions as a module which is easily removable and replaceable for maintenance purposes. All of the components of the end-cutting unit 49 are connected to the carousel 35 through the frame member 51 and are removable along with the frame member 51. It is to be understood, however, that the component parts of each end-cutting unit 49 could be connected directly to the carousel 35 if interchangeability of the units 49 is not desired.

As best seen in FIGS. 6 and 7, the end-cutting unit 49 includes a sausage support or cradle 53 which is connected to the frame member 51, which is in turn connected to the carousel 35. The support 53 is formed of a piece of angle stock having its point oriented toward the frame member 51 so that the flanges of the angle stock form an opening which is directed outwardly toward the periphery of the carousel 35. The sausage support 53 extends downwardly from near the top of the end-cutting unit 49 to a bottom end 55 and is of a length which is somewhat shorter than the length of the sausages 3. The upper end of the support 53 is generally in alignment with the path of the main conveyor 21 as it passes through the end-cutting and stripping station 24, whereas the bottom end 55 is spaced outwardly therefrom. The outward spacing of the bottom end 55 of the sausage support 53 from the path of the main conveyor 21 pushes the bottom end 15 of the sausage 3 outwardly so as to steady the sausage 3 against the support 53 and facilitate seating of a sausage 3 within the support or cradle 53.

Figure 4:
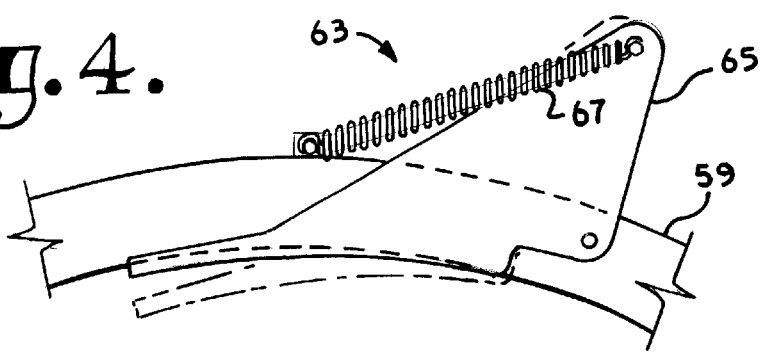
FIG. 4 is an enlarged top view of a spring retainer.

As shown in FIG. 3, a stationary retainer cage 57 also acts to hold the sausages 3 against the supports 53. The cage 57 is constructed in two sections, each of which is comprised of a plurality of arcuate plates 59 connected by rods 61. The cage 57 is connected to the superstructure 39 between the entrance point 45 and exit point 47 of the main conveyor 21 and is spaced from the carousel 35 so as to loosely press the sausages 3 against their respective supports 53. Attached to the lowermost plate 59 are a plurality of spring biased retainers 63 shown in FIG. 4. Each of the retainers 63 comprises a generally triangular retainer plate 65 and a tension spring 67 connected between the retainer plate and the cage 57. The springs 67 pull the respective retainer plates 65 into contact with the sausages 3 and thereby bias the sausages 3 against the supports 53.

Referring again to FIGS. 6 and 7, a pair of tracks or slide rods 69 are connected to each frame member 51 such that one of the slide rods 69 lies to each side of the sausage support 53. The slide rods 69 run generally parallel to the support 53 and extend from below the bottom end 55 of the support 53 to a point proximate to or slightly above the bottom end 55. A sliding member or carriage 71 is slidably mounted on the slide rods 69 for movement toward and away from the bottom end 55 of the support 53. The carriage 71 may be of any construction capable of sliding movement along the tracks 69, and may comprise a pair of lower slide blocks 73, each of which includes a receiver or bore (not shown) which slidably engages a respective one of the slide rods 69, and a mounting plate 77 which is secured between the slide blocks 73. An upper slide block 73 is positioned on one of the slide rods 69 above the respective slide block 73 and connected to the mounting plate 77 by a bracket 81.

Pivotally mounted to the mounting plate 77 and extending upwardly therefrom are a pair of sensor fingers 83, which are best seen in FIGS. 7 and 10–12. Each of the sensor fingers 83 includes a sleeve 85 which rotatably receives a respective pin 87 that extends outwardly form the mounting plate 77. Extending upwardly from each sleeve 85 is a rod 89. The rods 89 bend inwardly toward one another proximate their respective distal ends 91 and each include a generally wedge shaped sensor tip 93 which is secured to the respective distal end 91. The sensor tips 93 are moveable toward or away from one another by pivoting the fingers 83 about the pins 87. Each finger 83 further includes a lever arm 95 which extends inwardly from the respective sleeve 85 toward the other sleeve 85. Each lever arm 95 includes a hole 97 passing therethrough, the holes 97 being aligned with one another to mutually receive a pin 99. A tension spring 101 is connected to the pin 99 and biases the lever arms 95 downward, pulling the sensor tips 93 toward one another.

Referring again to FIGS. 6 and 7, a first double-acting linear actuator or lift cylinder 103, which may be pneumatically operated, has a cylinder base 105 connected to the frame member 51 below the carriage 71 and an extensible rod 107 connected to the pin 99. As is conventional for double-acting cylinders, the lift cylinder 103 has a base end port 109 and a rod end port 111. Supplying pressurized air to the base end port 109 of the cylinder 103 will cause the rod 107 to extend. Conversely, supplying pressurized air to the rod end port 111 will cause the rod 107 to retract. Extension of the rod 107 both drives the carriage 71 upwardly and overcomes the bias of the spring 101 to push the sensor tips 93 apart. Retraction of the rod 107 moves the carriage 71 downwardly and allows the spring 101 to pull the sensor tips 93 toward one another.

Also mounted to the carriage 71 is a pneumatic casing cutter 113 which comprises a rotary air motor 115 having a circular knife blade 117 operatively mounted thereon. The casing cutter 113 is pivotally mounted to the carriage 71 for rotation about the slide rod 69 opposite the upper slide block 73. The blade 117 is oriented transversely to the sausage support 53. A second double-acting linear actuator or pivot cylinder 119 is connected between a rocker arm 121 extending outwardly from the casing cutter 113 and a cylinder mounting plate 123 extending inwardly from the frame member 51. Extension of the pivot cylinder 119 causes the casing cutter 113 to pivot inwardly such that the blade 117 is positioned immediately above the sensor tips 93.

Air is supplied to each of the end-cutting units 49 through an air control system, which includes an air control valve 125 mounted on the carriage 71. The valve 125 is best seen in FIG. 10. The air control valve 125 has a trigger or plunger 127 which is operated by a lever 129 which extends downwardly from one of the sensor finger sleeves 85. The valve 125 is positioned such that the lever 129 will contact the plunger 127 and actuate the valve 125 when the tips 93 of the sensor fingers 83 move proximate one another upon passing around the end of the sausage. The valve 125 is operatively connected to the lift cylinder 103, the air motor 115 and the pivot cylinder 119. The valve 125 functions as an actuator control mechanism for the lift cylinder 103 by selectively cutting off air flow to the rod end port 111, and thereby halting retraction of the lift cylinder 103. Simultaneously, the valve 125 directs air to the air motor 115 and pivot cylinder 119, causing the blade 117 to begin to rotate and the pivot cylinder 119 to extend.

Referring to FIG. 6, the air control system further includes a control valve block 131 for each end-cutting unit 49. Each control valve block 131 is connected to the frame member 51 of the respective unit 49. The control valve block 131 includes three lever-actuated trip valves: a primary lift valve 133 and secondary lift valve 135 which control airflow to the lift cylinder 103, and a casing cutter valve 137 which controls airflow to the air motor 115 and pivot cylinder 119. The valves 133, 135 and 137 may be low pressure valves which are connected to respective pilot operated valves (not shown) which directly control the airflow to the lift cylinder 103, pivot cylinder 119, and air motor 115.

Figure 8:
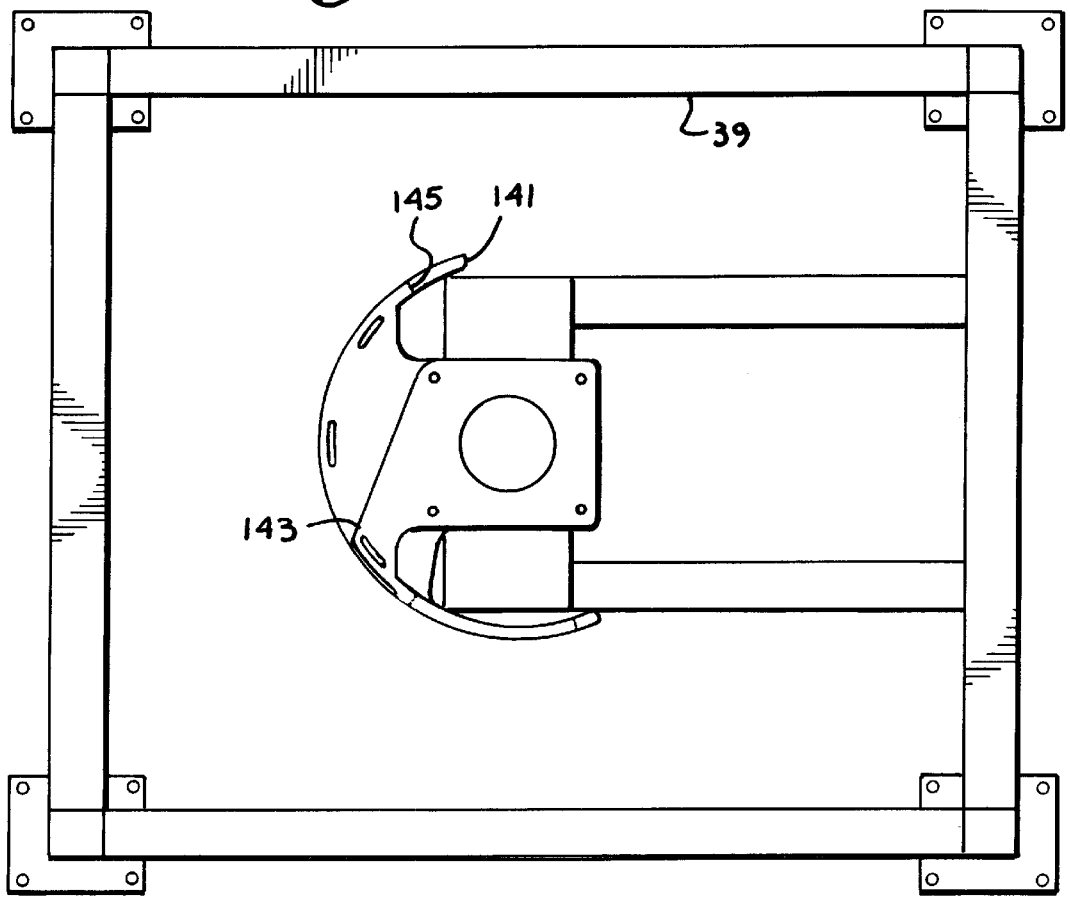
FIG. 8 is a cross-sectional view of the casing end-cutting apparatus taken generally along line 8—8 in FIG. 5.
Figure 9:
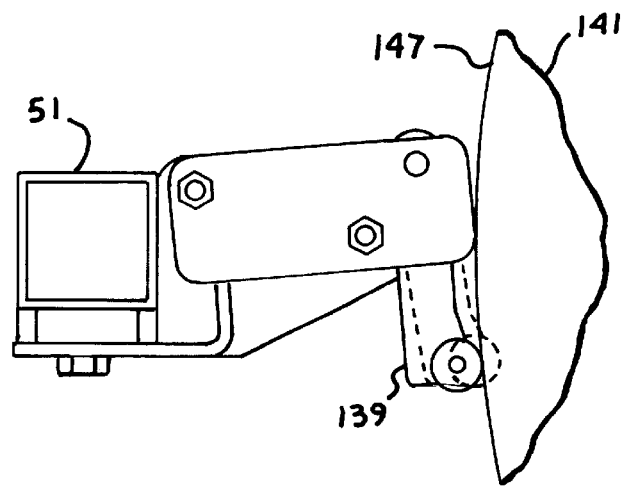
FIG. 9 is an enlarged top view of the primary lift valve and a portion of the primary lift cam showing movement of the trip lever thereof

The control valve block 131 is positioned on the respective end-cutting unit 49 such that each of the trip valves will be actuated by contact between an associated trip lever or cam follower 139 for each valve and a respective cam plate which extends outwardly from the lower hub 41 as the carousel 35 rotates. Referring to FIG. 8, a primary lift cam 141 actuates the primary lift valve 133, a secondary lift cam 143 actuates the secondary lift valve 135, and a casing cutter cam 145 actuates the casing cutter valve 137. Each of the cam plates has a respective cam face 147. As the carousel 35 rotates, the respective valve stays actuated for as long as the trip lever 139 of the valve is in contact with the cam face 147. When the trip lever 139 moves past the end of the cam face 147, the valve 133, 135, or 137 is returned to its normal position.

In use, the end-cutting apparatus 25 functions to cut the casings 9 of a succession of sausages 3 immediately above the bottom clip 17 so that each sausage 3 may be separated from the respective casing 9 through the bottom end 15 thereof. As the sausages 3 come onto the carousel 35, each sausage 3 is received by a respective end-cutting unit 49 and supported by the sausage support or cradle 53 thereof The lift cylinder 103 is initially extended, with the carriage 71 at its upper limit and the sensor fingers 83 spread apart, as shown in FIG. 10. Shortly after the sausage 3 is seated against the support 53, the trip lever 139 of the primary lift valve 133 contacts the primary lift cam 141, opening the valve 133, and causing the rod 107 of the lift cylinder 103 to begin to retract. As the rod 107 retracts, the sensor fingers 83 are drawn together and the tips 93 thereof are brought into contact with the sausage 3, as shown in FIG. 11. Simultaneously, the carriage 71 begins to move downwardly.

As the carriage 71 moves downwardly, the sensor tips 93 slide along the casing 9 of the sausage 3, and are held against the casing 9 by the bias of the tension spring 101. When the sensor tips 93 reach the bottom end 15 of the sausage 3, the spring bias pulls the sensor fingers 83 toward one another as shown in FIG. 12. As the sensor fingers 83 move toward each other, the lever 129 attached to one of the sensor fingers 83 pivots outwardly, depressing the plunger 127 of the air control valve 125, which cuts off the flow of air to the lift cylinder 103 and stops the downward movement of the carriage 71. The carriage 71 is thereby stopped in a position where the sensor tips 93 of the sensor fingers 83 are located against the casing 9 at the bottom end 15 of the sausage 3, proximate the bottom clip 17.

Shortly after the lift cylinder 103 begins to retract, the trip lever 139 of the casing cutter valve 137 contacts the face 147 of the casing cutter cam 145, opening the valve 137. Air does not begin to flow to the air motor 115 or pivot cylinder 119 of the casing cutter 113, however, until the carriage mounted air control valve 125 is actuated. Once the valve 125 has been actuated, air is supplied to the air motor 115, causing the blade 117 to begin to rotate. Simultaneously, the pivot cylinder 119 extends, pivoting the casing end cutter 113 and bringing the blade 117 into contact with the casing 9 immediately above the sensor tips 93 of the sensor fingers 83, and thereby cutting through the casing 9 just above the lower clip 17. The amount of time required for the casing cutter 113 to pivot into contact with the casing 9 is generally sufficient for the blade 117 to reach an operating speed adequate to allow the blade 117 to slice through the casing 9. After the casing 9 is cut, the trip lever 139 of the casing cutter valve 137 comes off the ends of the cam faces 147 of the casing cutter cam 145, causing the blade 117 to stop spinning and the casing cutter 113 to pivot back into its retracted position.

Referring to FIG. 13, as the carousel 35 continues to rotate, the newly cut bottom ends 15 of the sausages 3 will be supported by an arcuate first bottom plate or "dead plate" 149 which is connected to the superstructure 39. The dead plate 149 prevents the sausages 3 from sliding out of the casings 9 prematurely. Before a respective end-cutting unit 49 reaches the dead plate 149, however, the carriage 71 must first be lowered to clear the plate 149. This is accomplished by means of the secondary lift valve 135 and secondary lift cam 143. As the unit 49 approaches the dead plate 149, the trip lever 139 of the secondary lift valve 135 contacts the face 147 of the secondary lift cam 143, opening the valve 135. This causes air to be supplied to the rod end port 111 of the lift cylinder 103, bypassing the carriage mounted air control valve 125, and lowering the carriage 71 to its fully lowered position. During downward movement of the carriage 71, the sensor fingers 83 remain together, and the end portion of the casing which was cut off by the casing cutter 113 remains held therebetween.

When the sausages 3 reach the exit point 47 of the main conveyor 21, the sausages are received by the casing stripper 27. After the sausages 3 have exited the carousel 35, the trip levers 139 of the primary and secondary lift valves 133 and 135 come off the ends of the respective cams 141 and 143. This allows the lift cylinder rod 107 to extend, raising the carriage 71 back to its initial raised position in preparation for receiving another sausage 3. As the rod 107 first begins to move upwardly, the sensor fingers 83 are pushed apart, and the cut end of the sausage casing 9 is released from between them and falls into a collection receptacle (not shown).

Referring to FIG. 3, the casing stripper 27 includes a slatted conveyor 151, such as an INTRALOX® conveyor manufactured by the Laitram Corp. of New Orleans, La. The conveyor 151 is driven off of the main conveyor 21 so as to operate in synchronization therewith. The conveyor 151 includes a first leg 153 lying in the same general vertical plane as the main conveyor 21 and spaced below the main conveyor 21. The first leg 153 has an entrance end 155 located proximate the exit point 47 of the end-cutting apparatus 25 where the main conveyor 21 exits the carousel 35. The slatted conveyor 151 includes a continuous belt 157 having a plurality of vertical slats 159 extending outwardly therefrom. The slats 159 are spaced apart along the belt 157 such that slots 161 are formed therebetween, the slots 161 each being sized to accept one of the sausages 3 as it exits the carousel 35. The conveyor 151 is preferably mounted such that the entrance end 155 can be pivoted away from the carousel 35 for service and cleaning.

A pair of stripper rods 163 are positioned above the first leg 153 of the slatted conveyor 151 and below the main conveyor 21. The stripper rods 163 are positioned such that the string loops 7 of the sausages 3 suspended from the main conveyor 21 pass between the stripper rods 163 as the sausages 3 move off of the carousel 35 and onto the slatted conveyor 151. The rods 163, however, are spaced closely enough together that the sausages 3 cannot pass through the slot formed therebetween. As shown in FIG. 14, the portion of the main conveyor 21 positioned over the slatted conveyor 151 is inclined upwardly such that as the sausages 3 move onto the slatted conveyor 151, upward tension is applied to the string loops 7. The sausages 3, however, are prevented from moving upwardly by the stripper rods 163. The upward tension applied to the string loops 7 is thus transferred to the casings 9 of the sausages 3 and acts to pull the casings 9 off of the sausages 3, the sausages 3 exiting the casings 9 through the cut bottom ends 15 thereof.

Referring again to FIG. 3, after separation of the casings 9 from the sausages 3, the empty casings 9 continue to advance with the main conveyor 21 until they are deposited into the holding bin 33. The sausages 3 advance with the slatted conveyor 151 and are temporarily retained within the slots 161 by a second bottom plate 165 positioned below the first leg 153 of the conveyor 151 and in general horizontal alignment with the first bottom plate 149 of the end-cutting apparatus 25. The second bottom plate 165 acts to keep the sausages 3 from dropping out of the bottoms of the slots 161 until the sausages 3 reach a drop point 167 at the end of the plate 165. A plurality of vertically spaced horizontal bars 169 are positioned alongside the first leg 153 of the conveyor 151 to prevent the sausages 3 from falling out the sides of the slots 161.

When the sausages 3 reach the drop point 167, the sausages 3 fall out of the slatted conveyor 151 and onto the high speed conveyor 29 which is positioned therebelow. The high speed conveyor 29 carries the sausages 3 on to the slicing station (not shown).

It is to be understood that while certain forms of the present invention have been illustrated and described herein, it is not to be limited to the specific forms or arrangement of parts described and shown. For example, while the pneumatic actuators 103 and 119, and the air motor 115 are described as being mechanically actuated by cams contacting respective trip valves, the timing of the movements of the motor and actuators could be controlled in other ways, such as by a pneumatic circuit wherein each movement is triggered by the completion of the preceding step. The use of an electronic system using position sensing switches to time actions based upon the positions of various elements in the system, including the sausages, is also considered to be within the scope of the present invention.

It is also to be understood that the apparatus and process for cutting the ends of casings off of sausages is described with reference to casings using metal clips as fasteners, other fasteners including string could be used. In addition, the term fastener as used herein when describing the structure or device for closing the ends of the casing may also refer to a knot formed in the casing, stitching or adhesives to hold the casing shut, a seal formed by melting the casing together or other fastening means currently known or later developed.

What is claimed and desired to be secured by Letters Patent is as follows:

1. A sausage casing end-cutting unit for making a transverse cut in the casing of a sausage such that the sausage may be removed from the casing through said transverse cut; said end-cutting unit comprising:
 a) a frame member;
 b) a sausage support connected to said frame member for supporting a sausage;
 c) a carriage slidably mounted to said frame member;
 d) a first linear actuator connected between said carriage and said frame member for moving said carriage toward and away from an end of said sausage support;
 e) a sensor finger pivotally mounted to said carriage and having a tip, said tip being biased inwardly;
 f) an actuator control mechanism having a trigger, said actuator control mechanism operatively connected to said first linear actuator for stopping movement of said carriage upon actuation of said trigger, said trigger being positioned proximate said sensor finger and actuated by inward movement of said sensor finger;
 g) a casing cutter connected to said carriage and having a blade positioned proximate said sensor finger tip, said blade moveable between a retracted position and a cutting position, wherein:
 h) as said carriage moves away from said sausage support end, said sensor finger tip slidingly engages a sausage supported on said sausage support, said sensor finger moving inwardly when said tip reaches an end of the sausage, the inward movement actuating said trigger and stopping said carriage, said blade then moving into the cutting position and making a transverse cut through the sausage casing proximate the lower end of the sausage.

2. The end-cutting unit as in claim 1 wherein:
 a) said casing cutter includes a motor and said blade is a circular blade operatively connected to said motor;
 b) said casing cutter is pivotally connected to said carriage; and
 c) said end-cutting unit further includes a second linear actuator connected between said carriage and said casing cutter for pivoting said motor and said blade between the retracted position and the cutting position.

3. The end-cutting unit as in claim 2 wherein:
a) said motor is an air motor and each said second linear actuator is a pneumatic cylinder;
b) said motor and said second linear actuator are operatively connected to a pressurized air source through said actuator control mechanism such that said air motor rotates said blade and said second linear actuator moves said blade into the cutting position upon actuation of said trigger.

4. The end-cutting unit as in claim 1 wherein said sensor finger is a first sensor finger having a first tip and said end-cutting unit further includes a second sensor finger pivotally connected to said carriage and having a second tip, said first and second sensor finger tips being biased inwardly in opposed directions for slidably engaging opposing sides of a sausage supported on said sausage support.

5. The end-cutting unit as in claim 4 wherein said first and second sensor fingers each include a respective lever arm extending inwardly therefrom, said lever arms each including a respective receiver, said receivers mutually accepting a pin, said pin serving to connect said first linear actuator to said carriage such that extension of said first linear actuator both moves said carriage upwardly and overcomes said bias to pivot said first and second sensor fingers outwardly, retraction of said linear actuator moving said carriage downwardly and allowing said bias to pivot said first and second sensor fingers inwardly.

6. The end-cutting unit as in claim 5 wherein said bias is provided by a spring connected to said pin and urging said pin downwardly.

7. A sausage casing end-cutting unit for making a transverse cut in the casing of a sausage such that the sausage may be removed from the casing through said transverse cut; said end-cutting unit comprising:
a) a frame member;
b) a sausage support connected to said frame member for supporting a sausage;
c) a carriage slidably mounted to said frame member;
d) a pair of sensor fingers pivotally mounted to said carriage and extending outwardly from said carriage toward said sausage support, each said sensor finger including a lever arm extending outwardly from the respective sensor finger toward the other of said sensor fingers, each said lever arm including a pin receiver, each said sensor finger having a tip;
e) a pin mutually received by each of said pin receivers;
f) a first linear actuator connected between said pin and said frame member;
g) a spring connected between said pin and said frame member and biasing said sensor fingers inwardly toward one another;
h) an actuator control mechanism having a trigger, said actuator control mechanism operatively connected to said first linear actuator for stopping movement of said carriage upon actuation of said trigger, said trigger being positioned proximate one of said sensor fingers and actuated by inward movement of said one sensor finger;
i) a casing end-cutter connected to said carriage and having a blade positioned proximate said sensor finger tips, said blade moveable between a retracted position and a cutting position, wherein:
j) as said carriage moves away from said sausage support end, said sensor finger tips slidingly engage a sausage supported on said sausage support, said spring moving said sensor fingers inwardly when said tips reach an end of the sausage, the inward movement actuating said trigger and stopping said carriage, said blade then moving into the cutting position and making a transverse cut through the sausage casing proximate the lower end of the sausage.

8. The end-cutting unit as in claim 7 wherein:
a) said casing cutter includes a motor and said blade is a circular blade operatively connected to said motor;
b) said casing cutter is pivotally connected to said carriage; and
c) said end-cutting unit further includes a second linear actuator connected between said carriage and said casing cutter for pivoting said motor and said blade between the retracted position and the cutting position.

9. The end-cutting unit as in claim 8 wherein:
a) said motor is an air motor and each said second linear actuator is a pneumatic cylinder;
b) said motor and said second linear actuator are operatively connected to a pressurized air source through said actuator control mechanism such that said air motor rotates said blade and said second linear actuator moves said blade into the cutting position upon actuation of said trigger.

10. A sausage casing end-cutting apparatus for cutting lower ends off of sausage casings on a succession of sausages hanging generally vertically downward from a conveyor and advancing therewith, said end-cutting apparatus comprising:
a) a carousel mounted for rotation about a generally vertical axis, said carousel including a plurality of casing end-cutting units circumferentially spaced around the perimeter of said carousel, said carousel being operatively connected to the conveyor such that each said end-cutting unit receives a respective sausage as the conveyor advances, each said end-cutting unit comprising:
i) a sausage support for supporting a sausage;
ii) a carriage slidably mounted to said carousel below said sausage support;
iii) a first linear actuator connected between said carriage and said carousel for moving said carriage toward and away from a lower end of said sausage support;
iv) a sensor finger pivotally connected to said carriage and extending upwardly therefrom, said sensor finger having a tip, said tip being biased inwardly;
v) an actuator control mechanism having a trigger, said actuator control mechanism operatively connected to said first linear actuator for stopping movement of said carriage upon actuation of said trigger, said trigger being positioned proximate said sensor finger and actuated by inward movement of said sensor finger; and
vi) a casing cutter connected to said carriage and having a blade positioned proximate said sensor finger tip, said blade moveable between a retracted position and a cutting position, wherein:
vii) as said carriage moves away from said sausage support lower end, said sensor finger tip slidingly engages a sausage supported on said sausage support, said sensor finger moving inwardly when said tip reaches the lower end of the sausage, the inward movement actuating said trigger and stopping said carriage, said blade then moving into the cutting position and making a transverse cut through the sausage casing proximate the lower end of the sausage.

11. The end-cutting apparatus as in claim 10 wherein for each said end-cutting unit:
   a) said casing cutter includes a motor and said blade is a circular blade operatively connected to said motor;
   b) said casing cutter is pivotally connected to said carriage; and
   c) said end-cutting unit further includes a second linear actuator connected between said carriage and said casing cutter for pivoting said motor and said blade between the retracted position and the cutting position.

12. The end-cutting apparatus as in claim 11 wherein for each said end-cutting unit:
   a) said motor is an air motor and each said second linear actuator is a pneumatic cylinder;
   b) said motor and said second linear actuator are operatively connected to a pressurized air source through said actuator control mechanism such that said air motor rotates said blade and said second linear actuator moves said blade into the cutting position upon actuation of said trigger.

13. The end-cutting apparatus as in claim 10 wherein for each said end-cutting unit said sensor finger is a first sensor finger having a first tip and said end-cutting unit further includes a second sensor finger pivotally connected to said carriage and having a second tip, said first and second sensor finger tips being biased inwardly in opposed directions for slidably engaging opposing sides of a sausage supported on said sausage support.

14. The end-cutting apparatus as in claim 13 wherein for each said end-cutting unit said first and second sensor fingers each include a respective lever arm extending inwardly therefrom, said lever arms each including a respective receiver, said receivers mutually accepting a pin, said pin serving to connect said first linear actuator to said carriage such that extension of said first linear actuator both moves said carriage upwardly and overcomes said bias to pivot said first and second sensor fingers outwardly, retraction of said linear actuator moving said carriage downwardly and allowing said bias to pivot said first and second sensor fingers inwardly.

15. The end-cutting apparatus as in claim 14 wherein for each said end-cutting unit said bias is provided by a spring connected to said pin and urging said pin downwardly.

16. A sausage casing end-cutting and stripping station for removing sausage casings from a succession of sausages hanging generally vertically downward from a conveyor and advancing therewith, each said sausage having an upper end, a lower end and being encased in a respective sausage casing, said end-cutting and stripping station comprising:
   a) a carousel mounted for rotation about a generally vertical axis, said carousel including a plurality of casing end-cutting units circumferentially spaced around the perimeter of said carousel, said carousel being operatively connected to the conveyor such that each said end-cutting unit receives a respective sausage as the conveyor advances, each said end-cutting unit comprising:
      i) a sausage support for supporting a sausage;
      ii) a carriage slidably mounted to said carousel below said sausage support;
      iii) a first linear actuator connected between said carriage and said carousel for moving said carriage toward and away from a lower end of said sausage support;
      iv) a sensor finger pivotally connected to said carriage and extending upwardly therefrom, said sensor finger having a tip, said tip being biased inwardly;
      v) an actuator control mechanism having a trigger, said actuator control mechanism operatively connected to said first linear actuator for stopping movement of said carriage upon actuation of said trigger, said trigger being positioned proximate said sensor finger and actuated by inward movement of said sensor finger;
      vi) a casing cutter connected to said carriage and having a blade positioned proximate said sensor finger tip, said blade moveable between a retracted position and a cutting position, wherein:
      vii) as said carriage moves away from said sausage support lower end, said sensor finger tip slidingly engages a sausage supported on said sausage support, said sensor finger moving inwardly when said tip reaches the lower end of the sausage, said inward movement actuating said trigger and stopping said carriage, said blade then moving into the cutting position and making a transverse cut through the sausage casing proximate the lower end of the sausage; and
   b) a pair of generally parallel bars positioned below the conveyor and above the upper ends of the sausages supported therefrom, said bars being spaced an insufficient distance from one another for a sausage to pass therebetween and oriented at an angle to the conveyor such that said sausages are pulled upwardly against the bars as they advance along the conveyor, said bars forcing each sausage out of its respective casing through the transverse cut therein.

17. The end-cutting and stripping station as in claim 16 wherein for each said end-cutting unit:
   a) said casing cutter includes a motor and said blade is a circular blade operatively connected to said motor;
   b) said casing cutter is pivotally connected to said carriage; and
   c) said end-cutting unit further includes a second linear actuator connected between said carriage and said casing cutter for pivoting said motor and said blade between the retracted position and the cutting position.

18. The end-cutting and stripping station as in claim 17 wherein for each said end-cutting unit:
   a) said motor is an air motor and each said second linear actuator is a pneumatic cylinder;
   b) said motor and said second linear actuator are operatively connected to a pressurized air source through said actuator control mechanism such that said air motor rotates said blade and said second linear actuator moves said blade into the cutting position upon actuation of said trigger.

19. The end-cutting and stripping station as in claim 16 wherein for each said end-cutting unit said sensor finger is a first sensor finger having a first tip and said end-cutting unit further includes a second sensor finger pivotally connected to said carriage and having a second tip, said first and second sensor finger tips being biased inwardly in opposed directions for slidably engaging opposing sides of a sausage supported on said sausage support.

20. The end-cutting and stripping station as in claim 19 wherein for each said end-cutting unit said first and second sensor fingers each include a respective lever arm extending inwardly therefrom, said lever arms each including a respective receiver, said receivers mutually accepting a pin, said pin serving to connect said first linear actuator to said carriage such that extension of said first linear actuator both moves said carriage upwardly and overcomes said bias to pivot said first and second sensor fingers outwardly, retraction of said linear actuator moving said carriage downwardly and allowing said bias to pivot said first and second sensor fingers inwardly.

21. The end-cutting and stripping station as in claim 20 wherein for each said end-cutting unit said bias is provided by a spring connected to said pin and urging said pin downwardly.

22. An automated process for facilitating the removal of sausages from their respective casings, said casings closed at first and second ends of each sausage by first and second fasteners respectively and having a loop connected to said casing at said sausage first end; said process comprising:
   a) hanging each sausage by said loop from a conveyor assembly hook such that said second end of said sausage is supported below said first end of said sausage;
   b) sequentially conveying said sausages supported on said conveyor assembly hooks to a casing end-cutting area;
   c) upon advancement of each of said sausages into said casing end-cutting area, locating said second fastener for said casing; and
   d) upon locating said second fastener, cutting through said casing above said second fastener proximate said sausage second end to form an open end in said casing.

23. The automated process as in claim 22 wherein after the step of cutting through the casing of each sausage the process further comprises the steps of:
   a) conveying each sausage to a casing stripping area wherein said conveyor assembly hooks advance along a sausage stripping path above and in diverging relationship to a pair of opposed stripping members having a slot formed therebetween which is narrower than a diameter of said sausage, and advancing said first end of each sausage below said slot with said loop extending through said slot and advancing said conveyor assembly hooks along said sausage stripping path causing said casing to be pulled upward relative to said sausage and pushing said sausage out of said casing open end.

\* \* \* \* \*